(12) United States Patent
Dawoud et al.

(10) Patent No.: US 11,451,296 B2
(45) Date of Patent: Sep. 20, 2022

(54) TRANSMITTING AND RECEIVING SYMBOLS VIA UNIPOLAR SIGNALS

(71) Applicant: University of Surrey, Surrey (GB)

(72) Inventors: Diana Dawoud, Surrey (GB); Fabien Heliot, Surrey (GB); Muhammad Ali Imran, Surrey (GB)

( * ) Notice: Subject to any disclaimer, the term of this patent is extended or adjusted under 35 U.S.C. 154(b) by 40 days.

(21) Appl. No.: 16/759,681

(22) PCT Filed: Oct. 26, 2018

(86) PCT No.: PCT/GB2018/053106
§ 371 (c)(1),
(2) Date: Apr. 27, 2020

(87) PCT Pub. No.: WO2019/081945
PCT Pub. Date: May 2, 2019

(65) Prior Publication Data
US 2020/0295829 A1 Sep. 17, 2020

(30) Foreign Application Priority Data
Oct. 26, 2017 (GB) ...................................... 1717628

(51) Int. Cl.
| | |
|---|---|
| *H04B 10/04* | (2006.01) |
| *H04B 10/116* | (2013.01) |
| *H04B 10/516* | (2013.01) |
| *H04L 25/03* | (2006.01) |
| *H04L 27/26* | (2006.01) |

(52) U.S. Cl.
CPC ......... *H04B 10/116* (2013.01); *H04B 10/516* (2013.01); *H04L 25/03834* (2013.01); *H04L 27/264* (2013.01)

(58) Field of Classification Search
CPC ............ H04L 25/03834; H04L 27/264; H04L 25/0384; H04L 25/0391; H04L 25/4921; H04L 27/26534; H04L 25/4902; H04L 25/03847; H04L 25/03853; H04L 25/03859
USPC ......................................... 398/189, 190, 193
See application file for complete search history.

(56) References Cited

U.S. PATENT DOCUMENTS

| | | | | |
|---|---|---|---|---|
| 5,930,309 A | * | 7/1999 | Knutson | ............. H04L 25/4921 375/316 |
| 2015/0318925 A1 | * | 11/2015 | Tsonev | ................. H04B 10/116 398/79 |
| 2018/0234272 A1 | * | 8/2018 | Jiang | ................... H04L 25/0391 |

* cited by examiner

*Primary Examiner* — Hibret A Woldekidan
(74) *Attorney, Agent, or Firm* — Cionca IP Law P.C.; Marin Cionca

(57) ABSTRACT

A method of transmitting data via a unipolar signal comprises allocating a symbol to one or more signals among a plurality of signals, applying pulse shaping to the plurality of signals to obtain a plurality of filtered signals, wherein the filtered signals are orthogonal signals, and transmitting the sum of the filtered signals as a unipolar signal, wherein the transmitted signal is a weighted sum of the filtered signals. The data can be recovered at the receiver by applying a plurality of orthogonal matched filters to the received unipolar signal to obtain a plurality of filtered signals, and performing symbol detection on the plurality of filtered signals to determine the received symbol. Apparatus for transmitting and receiving unipolar signals are also disclosed.

14 Claims, 8 Drawing Sheets

TRANSMITTING AND RECEIVING SYMBOLS VIA UNIPOLAR SIGNALS

BACKGROUND OF INVENTION

1. Field of the Invention

The present invention relates to apparatus and methods for transmitting and receiving symbols via unipolar signals.

2. Description of the Related Art

Unipolar transmission schemes transmit data by modulating a unipolar signal, that is, a signal which only has a single polarity. An example of a unipolar transmission scheme is Visible Light Communication (VLC), which utilizes an intensity modulation (IM) signalling scheme to modulate the intensity of an optical carrier with a wavelength in the visible optical spectrum (around 380-700 nanometres). The optical signal is an example of a unipolar signal, since it cannot have a negative intensity. VLC is a technology that has gained considerable interest in recent years as a potential candidate for carrying mobile traffic indoors, in order to reduce the burden on existing RF systems, and enabling the next-generation of wireless communication networks to provide better data rates, spectral efficiency and energy efficiency.

In a VLC system the receiver uses direct detection (DD) to receive the optical signal. Real-valued orthogonal frequency division multiplexing (OFDM) has been proposed as a possible modulation technique for VLC in order to mitigate inter-symbol interference (ISI). In real-valued OFDM, quadrature symbols are converted to bipolar-real-valued symbols. The bipolar time-domain signal is then converted to a positive-unipolar signal by applying a direct current (DC) shift. However, OFDM signals have a high peak-to-average-power ratio (PAPR), meaning that the minimum of the negative peak of the time-domain signal can be very low, and consequently a high DC-bias is required to raise the entire negative peak above zero. DC-OFDM therefore suffers from poor energy efficiency as a result of the high DC bias that is needed. Hence, there is a need in the art for an improved solution for transmitting data via unipolar signals.

BRIEF INVENTION SUMMARY

According to a first aspect of the present invention, there is provided apparatus for transmitting a symbol via a unipolar signal, the apparatus comprising a symbol allocating unit configured to receive a symbol and allocate the symbol to one or more signals among a plurality of signals, a filter bank comprising a plurality of orthogonal pulse shaping filters each configured to apply pulse shaping to a respective one of the plurality of signals and output a filtered signal, wherein the filtered signals outputted by the plurality of pulse shaping filters are orthogonal signals, and a transmitter configured to transmit the sum of the filtered signals as a unipolar signal, wherein the transmitted signal is a weighted sum of the orthogonal pulse shapes.

In some embodiments according to the first aspect, the symbol is a quadrature symbol and the plurality of signals comprises one or more first signals and one or more second signals, wherein the symbol allocating unit is configured to allocate an in-phase component of the quadrature symbol to a selected one of the one or more first signals and allocate a quadrature part of the quadrature symbol to a selected one of the one or more second signals according to a predetermined look up table. For example, in some embodiments the quadrature symbol is an OFDM, QAM or QPSK data symbol.

In some embodiments according to the first aspect, the filter bank comprises one or more first pulse-shaping filters and one or more second pulse-shaping filters each configured to apply pulse shaping to a respective one of the one or more first signals and the one or more second signals, wherein the one or more first and second pulse-shaping filters are orthogonal.

In some embodiments according to the first aspect, the symbol allocating unit is configured to receive a symbol as a bipolar signal, the plurality of signals comprises a first signal and a second signal, and the symbol allocating unit comprises a polarity detector configured to allocate the symbol either to the first signal or to both the first and second signals by determining a polarity of the symbol, allocating the symbol to the first signal only in response to a determination that the symbol has a first polarity, and allocating the symbol to both the first and second signals in response to a determination that the symbol has an opposite polarity to the first polarity, and a polarity mapping unit configured to invert a polarity of a negative symbol before pulse shaping is applied. For example, in some embodiments the bipolar symbol is a real-OFDM symbol or bipolar pulse amplitude modulation (PAM) symbol.

In some embodiments according to the first aspect, the filter bank comprises a first pulse shaping filter configured to apply a unipolar first square pulse shape, and a second pulse shaping filter configured to apply an orthogonal bipolar second square pulse shape, wherein the sum of the first square pulse shape and the second square pulse shape is unipolar.

In some embodiments according to the first aspect, the filter bank comprises a first pulse shaping filter configured to apply a unipolar first prolate spheroidal wave functions (PSWF) pulse shape, and a second pulse shaping filter configured to apply an orthogonal bipolar second PSWF pulse shape, wherein a sum of the first PSWF pulse shape and the second PSWF pulse shape is unipolar. The bipolar second PSWF pulse shape may be a second order pulse shape.

In some embodiments according to the first aspect, the symbol is a quadrature symbol, the plurality of signals comprises first, second and third signals, and the filter bank comprises first, second and third filters configured to apply pulse shaping to the first, second and third signals respectively, wherein the symbol allocating unit is configured to allocate an in-phase component of the symbol to the first signal and to allocate a quadrature component of the symbol to the second signal, wherein the symbol allocating unit is further configured to determine the polarity of the symbol, invert a polarity of the symbol before pulse shaping is applied in response to a determination that the symbol has a negative polarity, and control the third signal to indicate whether or not the polarity of the symbol was inverted. The polarity of the symbol can be determined based on the polarity of the in-phase component of the symbol.

In some embodiments according to the first aspect, the plurality of signals comprises one or more first signals and one or more second signals and the filter bank comprises one or more first orthogonal pulse-shaping filters and one or more second orthogonal pulse-shaping filters, wherein the symbol allocating unit is configured to allocate the in-phase component to one of the one or more first signals and to allocate the quadrature component to one of the one or more second signals according to a predetermined look up table.

Each of the one or more first orthogonal pulse-shaping filters can be configured to apply pulse shaping to a respective one of the one or more first signals and each of the one or more second orthogonal pulse-shaping filters can be configured to apply pulse shaping to a respective one of the one or more second signals, wherein each of the one or more first orthogonal pulse-shaping filters is orthogonal to each of the one or more second orthogonal pulse-shaping filters. For example, the one or more first signals may comprise a first signal and the one or more second signals may comprise second, third and fourth signals. The one or more first orthogonal pulse shaping filters may comprise a first pulse shaping filter and the one or more second orthogonal pulse shaping filters may comprise second, third and fourth filters. The first, second, third and fourth orthogonal pulse-shaping filters are configured to apply pulse shaping to the first, second, third and fourth signals respectively, wherein the symbol allocating unit is configured to determine the polarity of each of an in-phase component and a quadrature component of the symbol. In response to a determination that the in-phase component has a positive polarity, the symbol allocating unit is configured to allocate the positive in-phase component to the first signal and allocate the quadrature component to the second signal, and in response to a determination that the in-phase component has a negative polarity, the symbol allocating unit is configured to invert a polarity of the in-phase component and allocate the inverted in-phase component to the first signal, to allocate the quadrature component to the third signal in response to a determination that the quadrature component has a positive polarity, and to invert a polarity of the quadrature component and allocate the inverted quadrature component to the fourth signal in response to a determination that the quadrature component has a negative polarity.

In some embodiments according to the first aspect, the sum of the filtered signals comprises a bipolar signal, and the apparatus further comprises a direct current DC biasing unit configured to apply a DC bias to convert the bipolar signal to a unipolar signal, before the filtered signals are transmitted by the transmitter.

In some embodiments according to the first aspect, the unipolar signal generator is configured to transmit the filtered signals as a Visible Light Communication VLC signal.

According to a second aspect of the present invention, there is provided apparatus for receiving a symbol via a unipolar signal, the apparatus comprising a receiver configured to receive a unipolar signal, a matched filter bank comprising a plurality of orthogonal matched filters each configured to apply filtering to the received unipolar signal and output a filtered signal, and a symbol detector configured to perform symbol detection on the plurality of filtered signals outputted by the matched filter bank to determine the received symbol.

In some embodiments according to the second aspect, the matched filter bank comprises first and second matched filters configured to output first and second matched signals respectively, and the apparatus further comprises a polarity detector configured to determine the polarity of the received symbol by comparing the difference in amplitude between the first filtered signal and the second filtered signal to the amplitude of the second filtered signal and assigning a polarity to said received symbol according to the result of the comparison, wherein the symbol allocating unit further comprises a polarity de-mapper that is configured to invert the polarity of the symbol in response to the polarity detector assigning a negative polarity to the symbol.

In some embodiments according to the second aspect, the matched filter bank comprises first, second and third matched filters configured to output first, second and third matched signals respectively, and the apparatus further comprises a polarity detector configured to determine the polarity of the symbol by detecting the amplitude of the third filtered signal and assigning a polarity to the symbol according to the result of the detected amplitude, wherein the symbol allocating unit further comprises a polarity de-mapper that is configured to invert a polarity of the symbol in response to the polarity detector assigning a negative polarity to the symbol.

In some embodiments according to the second aspect, the received symbol is a quadrature symbol, the matched filter bank comprises one or more first matched filters and one or more second matched filters configured to output one or more first matched signals and one or more second matched signals, wherein the one or more first matched filters are matched to one or more orthogonal pulse shaping filters of a transmitter and the one or more second matched filters are matched to one or more second orthogonal pulse shaping filters of the transmitter, the apparatus further comprising first and second amplitude detectors configured to detect the maximum amplitude value of each of the signals among the one or more first and second matched signals and output first and second detected signals, respectively, the apparatus further comprising a polarity detector for detecting the polarity of an in-phase and a quadrature component in response to the detected combination of the first and second detected signals according to an inverse look up table. For example, the one or more first matched filters may comprise a first matched filter configured to output a first matched signal, and the one or more second matched filters may comprise second, third and fourth matched filters configured to output second, third and fourth matched signals respectively, the first amplitude detector may be configured to output the first detected signal based on the first matched signal, the second amplitude detector may be configured to output the second detected signal based on the second, third and fourth matched signals, and the polarity detector may be configured to determine the polarity of an in-phase component of the symbol and the amplitude and polarity of a quadrature component of the symbol according to which one of the second, third and fourth matched signals is detected as the second detected signal, based on the inverse look up table. In response to the second detected signal being the second matched signal, the polarity detector may be configured to determine that the in-phase component has the same polarity as the first matched signal and that the quadrature component has the same polarity as the second matched signal, in response to the second detected signal being the third matched signal the polarity detector may be configured to determine that the in-phase component has the opposite polarity to the first matched signal and that the quadrature component has the same polarity as the third matched signal, and in response to the second detected signal being the fourth matched signal the polarity detector may be configured to determine that the in-phase component has the opposite polarity to the first matched signal and that the quadrature component has the opposite polarity to the fourth matched signal.

According to a third aspect of the present invention, there is provided a wireless communication system comprising a unipolar signal transmitter comprising the apparatus according to the first aspect, and a unipolar signal receiver comprising the apparatus according to the second aspect.

According to a fourth aspect of the present invention, there is provided a method of transmitting a symbol via a unipolar signal, the method comprising allocating a symbol to one or more signals among a plurality of signals, applying pulse shaping to the plurality of signals to obtain a plurality of filtered signals, wherein the filtered signals are orthogonal signals, and transmitting the sum of the filtered signals as a unipolar signal, wherein the transmitted signal is a weighted sum of the filtered signals.

According to a fifth aspect of the present invention, there is provided a method of receiving a symbol via a unipolar signal, the method comprising receiving a unipolar signal, applying a plurality of orthogonal matched filters to the received unipolar signal to obtain a plurality of filtered signals, and performing symbol detection on the plurality of filtered signals to determine the received symbol.

According to a sixth aspect of the present invention, there is provided a non-transitory computer-readable storage medium arranged to store computer program instructions which, when executed, perform a method according to the fourth aspect or a method according to the fifth aspect.

The above aspects or examples and advantages, as well as other aspects or examples and advantages, will become apparent from the ensuing description and accompanying drawings.

BRIEF DESCRIPTION OF THE DRAWINGS

Embodiments of the present invention will now be described, by way of example only, with reference to the accompanying drawings, in which.

DETAILED DESCRIPTION

Figure 1:
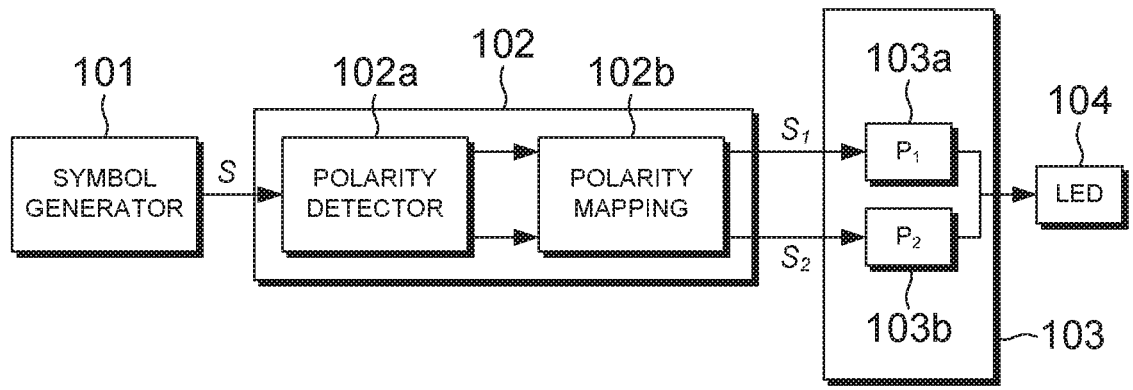
FIG. 1 illustrates apparatus for transmitting a unipolar signal in a wireless communication system, according to an embodiment of the present invention.

In the following detailed description, only certain exemplary embodiments of the present invention have been shown and described, simply by way of illustration. As those skilled in the art would realise, the described embodiments may be modified in various different ways, all without departing from the scope of the present invention. Accordingly, the drawings and description are to be regarded as illustrative in nature and not restrictive. Like reference numerals designate like elements throughout the specification.

Figure 2:
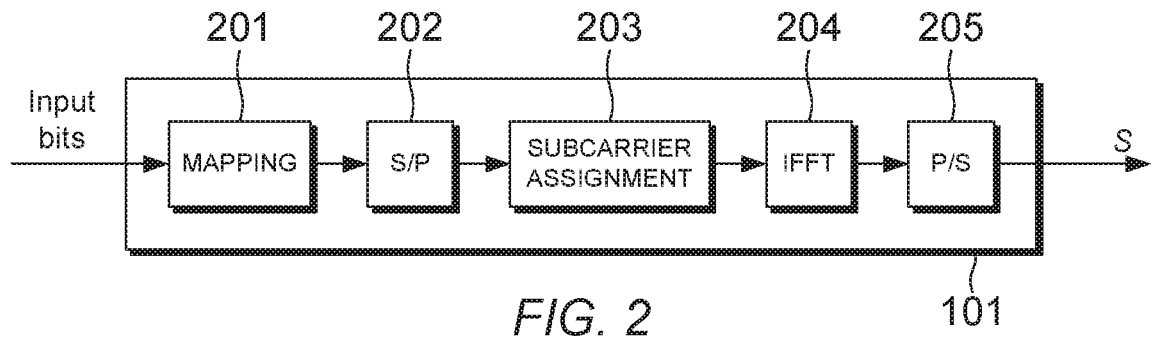
FIG. 2 illustrates apparatus for generating OFDM data symbols, according to an embodiment of the present invention.
Figure 3:
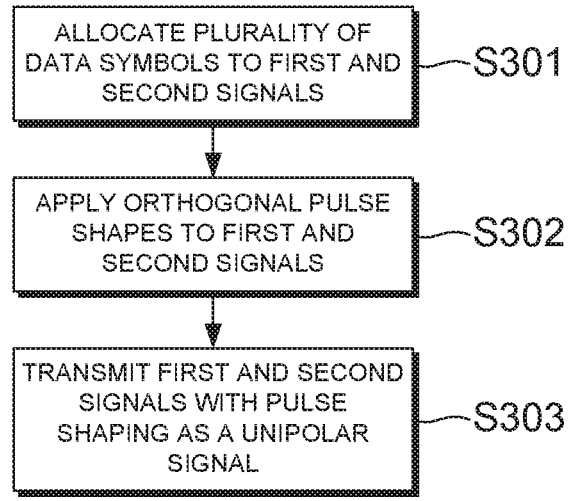
FIG. 3 is a flowchart showing a method of transmitting a unipolar signal in a wireless communication system, according to an embodiment of the present invention.

Referring now to FIG. 1, apparatus for transmitting data via a unipolar signal is illustrated according to an embodiment of the present invention. Apparatus for generating OFDM data symbols is illustrated in FIG. 2, and a flowchart showing a method of transmitting data via a unipolar signal is illustrated in FIG. 3.

The apparatus for transmitting data via a unipolar signal comprises a data symbol generator 101, a symbol allocating unit 102, a filtering block 103, and a unipolar signal generator 104. In the present embodiment the data symbol generator 101 is configured to generate an OFDM data symbol, and comprises the apparatus shown in FIG. 2. However, in other embodiments of the present invention the apparatus shown in FIG. 1 can be configured to operate on other types of data symbols than OFDM, such as pulse amplitude modulation (PAM).

The OFDM symbol generator 101 outputs a bipolar output signal comprising an OFDM data symbol S to the symbol allocating unit 102. The symbol allocating unit 102 is configured to allocate the OFDM data symbol to one or both of a first signal and a second signal in step S301 of the method shown in FIG. 3. The first and second signals are sent respectively to a first pulse shaping filter 103a and a second pulse shaping filter 103b of the filtering block 103. In the present embodiment the symbol allocating unit 102 comprises a polarity detector 102a configured to determine the polarity of the data symbol. The symbol allocating unit 102 is configured to send a data symbol with a positive polarity to the first pulse shaping filter $P_1$ 103a, and to send a data symbol with an inverted negative polarity to both the first pulse shaping filter $P_1$ 103a and the second pulse shaping filter $P_2$ 103b.

In step S302, the first pulse shaping filter 103a is configured to apply a first pulse shape to the first signal and output a first filtered signal, and the second pulse shaping filter 103b is configured to apply a second pulse shape to the second signal and output a second filtered signal. Here, the first and second pulse shapes are decomposed of orthogonal waveforms to each other. The first pulse shape comprises a unipolar waveform, and the first pulse shaping filter 103a is herein denoted by $P_1$. The second pulse shape comprises a bipolar waveform, and the second pulse shaping filter 103b is herein denoted by $P_2$. The resulting first and second pulse shapes are both unipolar, and are configured to provide pulse shaping and passband modulation to the first and second signals.

Since the sum of the first and second pulse shapes is always unipolar, the time-domain signal that is generated by summing the first and second pulse shaping filters 103a, 103b is always a unipolar signal. Accordingly, the sum of the first and the second filtered signals can be transmitted by the LED 104 without any DC shift. Therefore by applying pulse shaping filters which are configured to output a unipolar time-domain signal, embodiments of the present invention can provide energy-efficient unipolar transmission schemes.

In the present embodiment, since a bipolar real OFDM signal is generated, the symbol allocating unit 102 is configured to determine the polarity of each pulse on a bipolar OFDM symbol frame. In the case of a negative pulse, the polarity detector unit 102a is configured to output the pulse to the polarity mapper 102b, which inverts the negative pulse to a positive pulse. The inverted negative pulse (i.e. a positive pulse) is then sent to the first and the second pulse shaping filters 103a and 103b, which convert the inverted negative pulse into a continuous unipolar signal, referred to as the second filtered signal. In the case of a positive pulse, the polarity mapper unit 102 is configured to directly forward the pulse to the first pulse-shaping filter 103a without inversion. The first pulse shaping filter 103a converts the positive pulse into a continuous unipolar signal.

The filtering block 103 is configured to send the first and second filtered signals to the unipolar signal generator 104, which combines the first and second filtered signals into a combined unipolar signal and transmits the combined unipolar signal in step S303. In the present embodiment the apparatus is configured for use in a Visible Light Communication (VLC) system, and the unipolar signal generator 104 comprises a Light Emitting Diode (LED). In other VLC embodiments a different type of unipolar signal generator 104 may be used, for example a laser. Furthermore, in other embodiments the apparatus may be configured to generate a different type of unipolar signal other than an optical signal, and accordingly a different type of unipolar signal generator may be used.

A receiving apparatus can apply inverse matched filters to separate out and recover data from the first and second signals. The receiving apparatus can therefore reconstruct the original bipolar signal from the as-transmitted unipolar signal. Also, apparatus such as the one illustrated in FIG. 1 can be used to convert a bipolar signal, such as a real OFDM symbol frame, into an energy-efficient unipolar signal, since a DC offset does not have to be applied before transmitting the unipolar signal.

Figure 5:
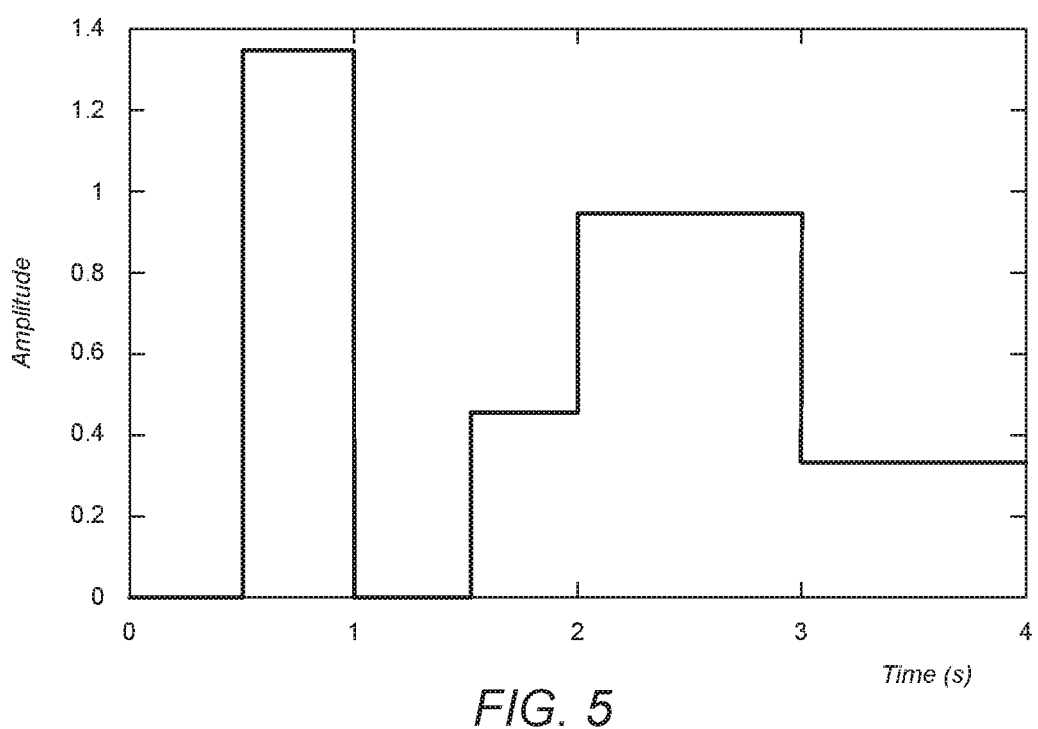
FIG. 5 illustrates an example of a unipolar continuous signal generated by the apparatus of FIG. 1, according to an embodiment of the present invention.

In the present embodiment, since both of the positive and the inverted-negative symbols are transmitted by positive-unipolar waveforms, an analogue unipolar symbol outputted by summing the first and second pulse shaping filters 103a, 103b comprises a pulse with a single polarity, and therefore can be readily intensity-modulated by the LED 104. FIG. 5 illustrates a resulting typical unipolar continuous signal generated by the LED 104. As shown in FIG. 5, the continuous time domain signal is unipolar, and therefore can be intensity modulated without the need for any additional DC-shift.

Continuing with reference to FIG. 2, in the present embodiment the OFDM symbol generator 101 comprises a constellation-mapping unit 201 which is configured to map input bits onto a plurality of M-ary symbols where M represents the modulation order. The mapped symbols are then sent to a serial-to-parallel converter 202 which buffers the symbols into a (K/2) M-ary symbol stream, where K/2 is the number of symbols per OFDM frame to be transmitted. In the present OFDM embodiment, the buffered (K/2) M-ary symbol stream corresponds to an OFDM symbol frame. The K/2 quadrature symbols of the OFDM symbol frame are converted to real-valued time-domain signals by a subcarrier assignment unit 203, which is configured to impose a Hermitian symmetry on the frame structure OFDM symbol frame and only load the odd-numbered subcarriers when assigning each of the K/2 quadrature symbols and the conjugated values of the K/2 quadrature symbols to a subcarrier. In this way, the K/2 quadrature symbols are converted to real-valued asymmetrical time-domain signals.

The subcarrier assignment unit 203 then outputs the frame to an N-point Inverse Fast Fourier Transform (IFFT) unit 204. As a result of Hermitian symmetry and only inputting the odd-numbered subcarriers to the IFFT unit 204, an asymmetrical time-domain signal is obtained at the output of the IFFT unit 204. The frame at the output of the subcarrier assignment unit 203 consists of the K/2 quadrature symbols and the conjugated values of the K/2 quadrature symbols. Hence in the present embodiment, N should be equal to 4K. The OFDM symbol generator 101 further comprises a parallel-to-serial converter 205 which converts the N-time-domain signal array outputted by the IFFT unit 204 into a serial N-time-domain signal array. In the present embodiment, only the first half of the N-time-domain signal array is utilised after the subcarrier assignment unit 203, meaning that only the first half of the N-time-domain signal array is converted into the serial time-domain signal array by the parallel-to-serial converter 205. The serial signal is then sent to the symbol allocating unit 102.

In another embodiment, instead of only using the odd-numbered subcarriers, all subcarriers may be sent to the IFFT unit 204. However, in the present embodiment the asymmetric property of the time-domain samples allows the receiver to recover the entire frame using just the first N/2 samples, without needing to transmit the remaining N/2 samples from the frame.

Figure 4:
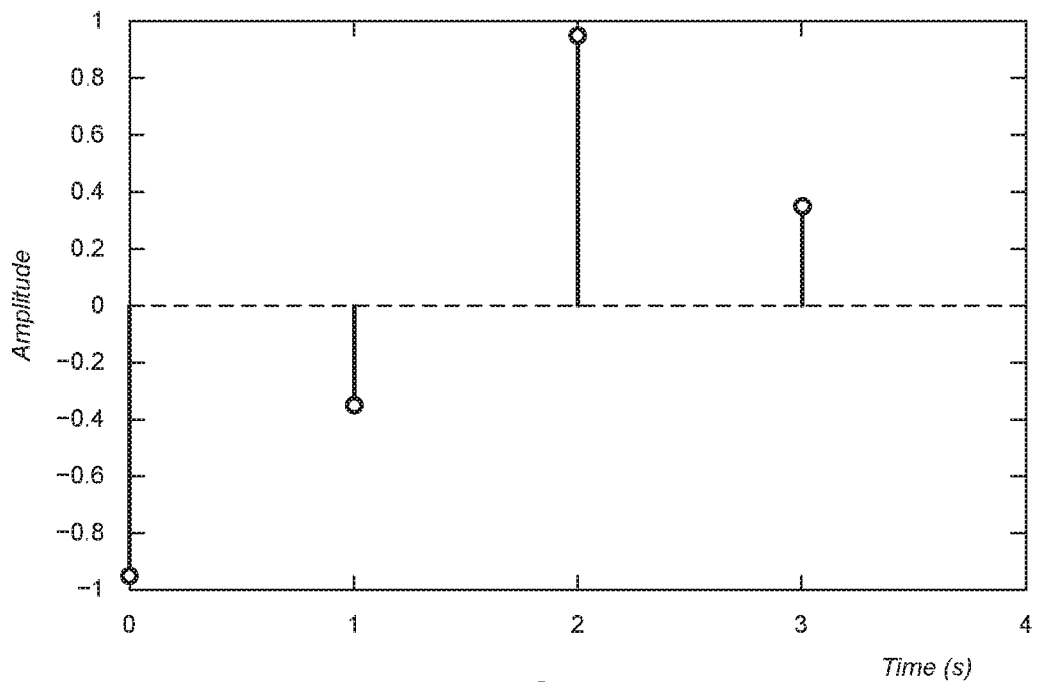
FIG. 4 illustrates an example of a bipolar signal at the output of the IFFT unit of FIG. 2, according to an embodiment of the present invention.

FIG. 4 illustrates an example of a typical bipolar signal outputted by the OFDM symbol generator 101. Since the bipolar OFDM signal cannot be intensity modulated, it must be unipolarized before being transmitted. In a prior art DC-OFDM method, a DC bias is applied to shift the minimum peak of the bipolar OFDM signal to zero. However, in OFDM systems the Peak-to-Average-Power Ratio (PAPR) of the time domain signal is high, meaning that a high DC shift is required. This in turn drastically reduces the energy efficiency of DC-OFDM systems. For instance, applying the necessary DC shift to a typical OFDM transmission in a VLC system can reduce the transmission power efficiency by at least 76%.

In comparison, embodiments of the present invention can convert a bipolar OFDM time-domain signal array into a unipolar OFDM time-domain signal array without the need to apply any DC bias, thereby increasing the energy efficiency by at least 76% when compared to a conventional DC-OFDM communication system. Additionally, embodiments of the present invention can achieve a full utilization (100%) of the transmission power efficiency, which is not possible when applying a DC offset.

In the embodiment illustrated in FIG. 1, first and second pulse shaping filters 103a, 103b are used to generate a unipolar signal from positive and negative parts of a bipolar input signal, which in the present embodiment is a real OFDM signal. In other embodiments, the orthogonal first and second pulse shaping filters can be applied to a different type of input signal, for example a quadrature signal in which each data symbol comprises an in-phase component and a quadrature component. In embodiments which are configured to operate on quadrature signals, the symbol allocating unit can be configured to allocate the in-phase component of each data symbol to the first signal and allocate the quadrature component of each data symbol to the second signal. Since the first and second pulse shapes are orthogonal, the receiver can separate out the in-phase and quadrature components in order to recover the original quadrature signal.

Furthermore, embodiments of the invention have been described in which two orthogonal pulse shaping filters are applied. In other embodiments one or more additional pulse shaping filters may be applied. For example, in one embodiment the transmitter may further comprise a third pulse shaping filter configured to apply a third pulse shape to a third signal and output a third filtered signal, the third pulse shape being orthogonal to each of the first and second pulse shapes. In this embodiment, the symbol allocating unit can be configured to allocate each one of the plurality of data symbols to the first, second and third signals.

Figure 6:
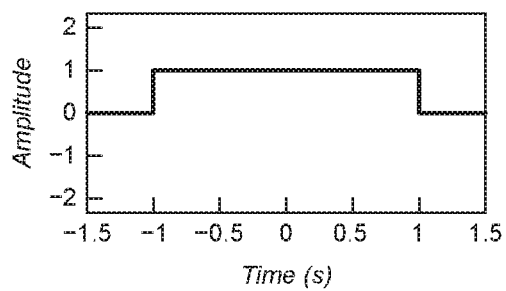
FIG. 6 illustrates a unipolar first square pulse shape, according to an embodiment of the present invention.
Figure 7:
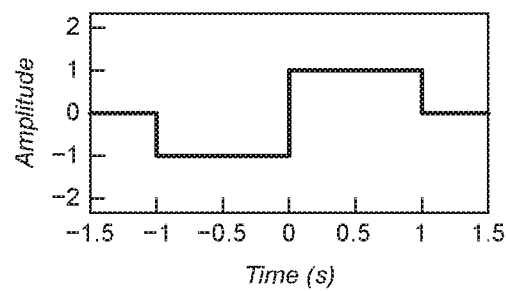
FIG. 7 illustrates a bipolar second square pulse shape that is orthogonal to the unipolar first square pulse shape of FIG. 6, according to an embodiment of the present invention.
Figure 8:
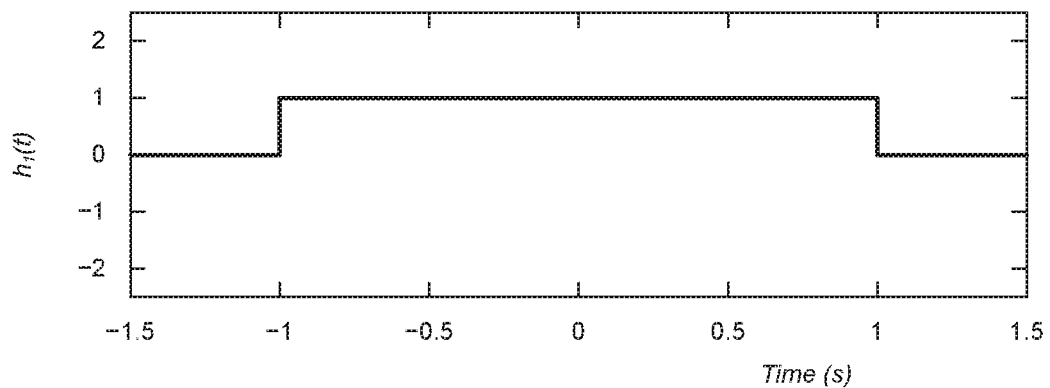
FIG. 8 illustrates a unipolar square waveform obtained by applying the unipolar first square pulse shape of FIG. 6 to a signal, according to an embodiment of the present invention.
Figure 9:
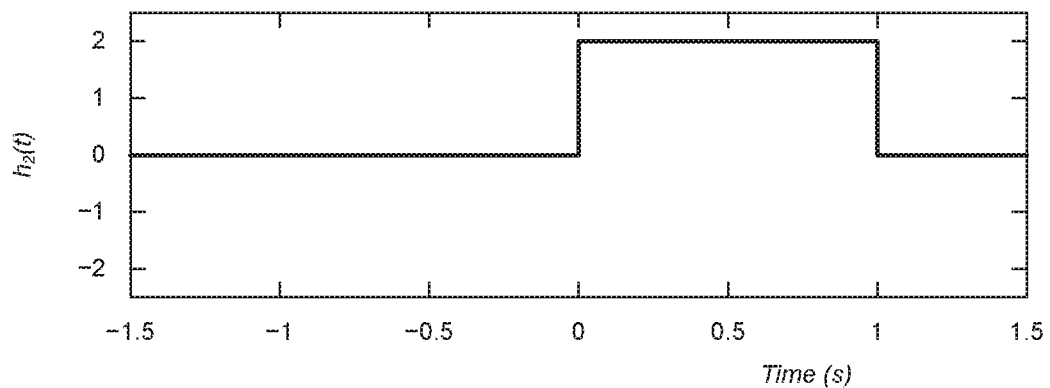
FIG. 9 illustrates a unipolar square waveform obtained by summing the unipolar first square pulse shape of FIG. 6 and the orthogonal bipolar second square pulse shape of FIG. 7, according to an embodiment of the present invention.

In embodiments of the present invention, various types of orthogonal pulse shapes may be applied by the first and second pulse shaping filters 103a, 103b. FIGS. 6-9 illustrate examples of orthogonal square pulse shapes that can be applied by the first and second pulse shaping filters, according to an embodiment of the present invention. Referring first to FIG. 6, an example of a unipolar first square pulse shape is illustrated, which can be applied by the first pulse shaping filter 103a to shape the positive symbols. A unipolar waveform that is obtained by applying the unipolar first square pulse shape of FIG. 6 is illustrated in FIG. 8, and can be used when transmitting a positive symbol. The unipolar first square pulse shape of FIG. 6 can be summed with a bipolar second square pulse shape, as shown in FIG. 7, to produce a unipolar square waveform as shown in FIG. 9. The bipolar second square pulse shape in FIG. 7 is orthogonal to the unipolar first square pulse shape of FIG. 6. The unipolar square waveform can be used when transmitting a negative symbol.

Figure 10:
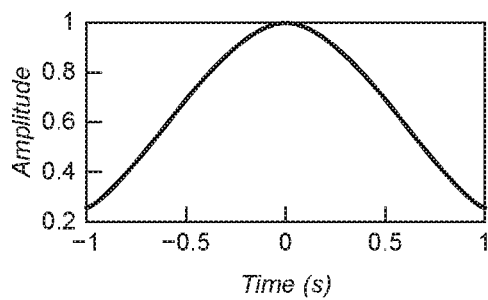
FIG. 10 illustrates a unipolar first modified Hermite pulse (MHP) pulse shape, according to an embodiment of the present invention.
Figure 11:
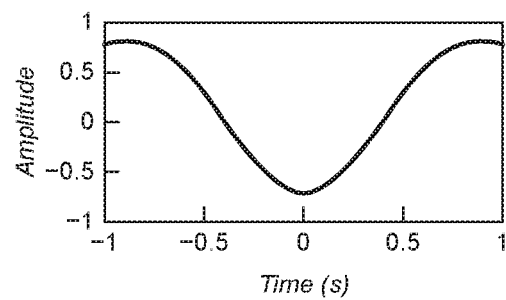
FIG. 11 illustrates a bipolar second MHP pulse shape that is orthogonal to the unipolar first MHP pulse shape of FIG. 10, according to an embodiment of the present invention.
Figure 12:
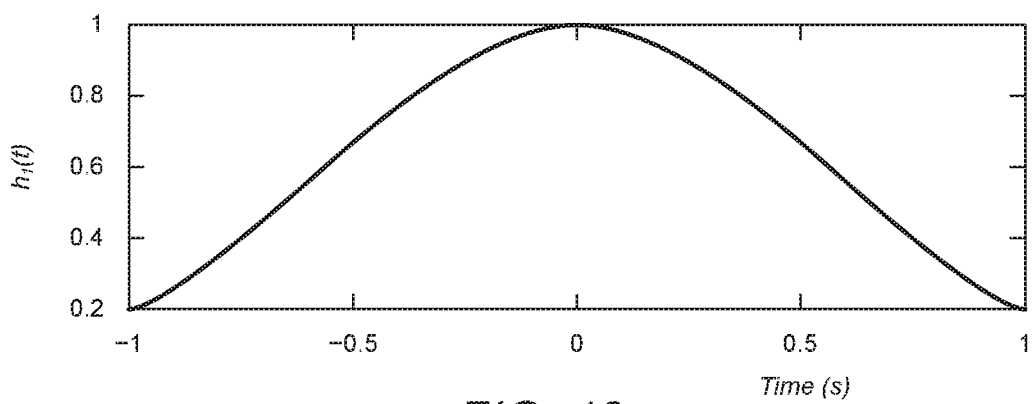
FIG. 12 illustrates a unipolar MHP waveform obtained by applying the unipolar first MHP pulse shape of FIG. 10 to a signal, according to an embodiment of the present invention.
Figure 13:
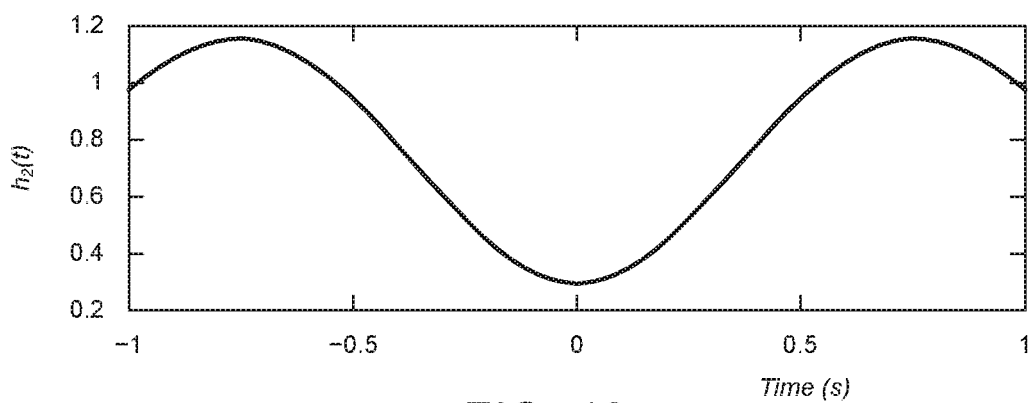
FIG. 13 illustrates a unipolar MHP waveform obtained by summing the unipolar first MHP pulse shape of FIG. 10 and the orthogonal bipolar second MHP pulse shape of FIG. 11, according to an embodiment of the present invention.

Referring now to FIGS. 10-13, further examples of orthogonal pulse shapes that can be applied by the first and second pulse shaping filters 103a, 103b are illustrated, according to another embodiment of the present invention. In the example shown in FIGS. 10-13, the first and second pulse shaping filters are configured to apply modified Hermite pulse (MHP) pulse shapes. FIG. 10 illustrates an example of a unipolar first MHP pulse shape, which is a zero-order MHP pulse shape that can be applied by the first pulse shaping filter 103a. FIG. 11 illustrates an example of an orthogonal second-order bipolar MHP pulse shape that can be applied by the second pulse shaping filter, which can be summed with the unipolar first MHP pulse shape of FIG. 9 to obtain a transmitted unipolar MHP waveform as shown in FIG. 13. FIG. 12 illustrates a unipolar MHP waveform that is obtained by applying the unipolar first MHP pulse shape of FIG. 10 to a signal. In one embodiment, the unipolar MHP waveform of FIG. 12 may be used when transmitting a positive symbol, and the unipolar MHP waveform of FIG. 13 may be used when transmitting a negative symbol.

It will be understood that the pulse shapes and waveforms illustrated in FIGS. 6 to 13 are provided by way of example only, and different pulse shapes may be applied by the first and second pulse shaping filters 103a, 103b in other embodiments of the present invention.

Figure 14:
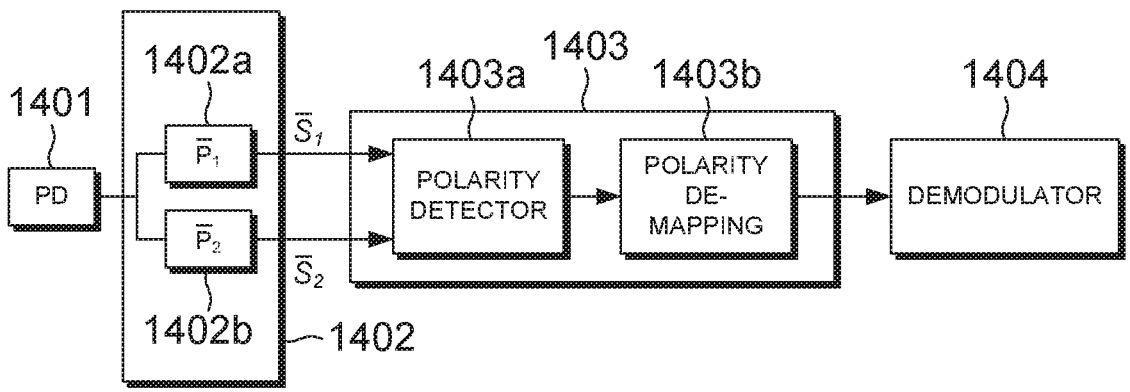
FIG. 14 illustrates apparatus for receiving a unipolar signal in a wireless communication system, according to an embodiment of the present invention.
Figure 15:
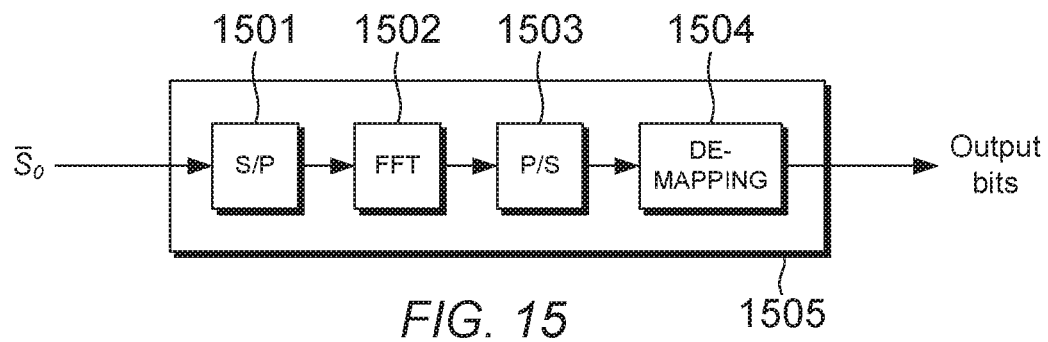
FIG. 15 illustrates apparatus for recovering data from OFDM data symbols, according to an embodiment of the present invention.
Figure 16:
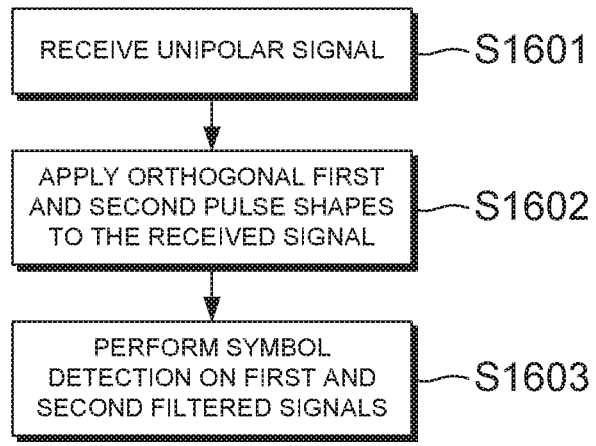
FIG. 16 is a flowchart showing a method of receiving a unipolar signal in a wireless communication system, according to an embodiment of the present invention.

Referring now to FIG. 14, apparatus for receiving data via a unipolar signal is illustrated according to an embodiment of the present invention. Apparatus for recovering data from OFDM data symbols is illustrated in FIG. 15, and a flowchart showing a method of receiving data via a unipolar signal is illustrated in FIG. 16.

The apparatus illustrated in FIG. 14 can be used to receive a signal transmitted by apparatus such as the one shown in FIG. 1. Together, the transmitting apparatus of FIG. 1 and the receiving apparatus of FIG. 14 form a system for transmitting and receiving data via the unipolar signal emitted by the LED 104.

The receiving apparatus comprises a unipolar signal receiver 1401, a matched filter bank 1402, a symbol detector 1403 and a demodulator 1404. In the present embodiment the receiver and transmitter are configured for use in a VLC system, and the unipolar signal receiver 1401 comprises a photodetector. In other embodiments a different type of receiver may be provided, depending on the type of unipolar signal that is used.

The detected unipolar signal is sent to the matched filter bank 1402, which in the present embodiment comprises first and second matched filters 1402a, 1402b. The first matched filter 1402a is configured to filter the received unipolar signal and output a first filtered signal $\overline{S}_1$. The first matched filter 1402a of the receiver is configured to apply a first filter that is matched to the one which was applied by the first pulse shaping filter 103a in the transmitter, and may therefore be referred to as a first matched filter. Similarly, the second matched filter 1402b is configured to apply a second filter which is matched to the second pulse shaping filter 103b that was applied in the transmitter. The second matched filter 1402b of the receiver outputs a second filtered signal $\overline{S}_2$. The symbol detector 1403 is configured to perform symbol detection on the first and second filtered signals to obtain the plurality of data symbols.

The pulse shaping operation in the present embodiment therefore consists of two fundamental pulse shapes, hereinafter denoted as $P_1(t)$ and $P_2(t)$. The continuous-time signal S(t) ready for transmission can be expressed as:

$$S(t) = \begin{cases} SP_1(t) & \text{if } S > 0; \\ \dfrac{-S}{\sqrt{2}}(P_1(t) + P_2(t)) & \text{if } S < 0. \end{cases}$$

In the present embodiment, in order to be able to translate the positive (S>0) and the negative (S<0) real digital signals into positive continuous-time waveforms, the impulse response of the first pulse shape, $P_1(t)$, and the impulse response of the linear combination of the first and second pulse shapes $P_1(t)$ and $P_2(t)$ are both positive. To put it another way, a first transmitted waveform that is generated by the first pulse shaping filter on its own is unipolar, as is a second transmitted waveform which is the sum of the filtered signals generated by the first and second pulse shaping filters at the transmitter is unipolar.

Furthermore, in the present embodiment since the first pulse shape is used in both the first and second transmitted waveforms, orthogonality between the negative and positive transmitted waveforms is lost. Therefore in the present embodiment, the symbol detector 1403 comprises a polarity detector 1403a and polarity de-mapper 1403b, wherein the polarity detector unit 1403a is configured to determine whether or not the polarity of the transmitted symbol was inverted and wherein the polarity de-mapper unit 1403b is configured to detect the transmitted symbol. The polarity detector unit 1403a detects the polarity of the transmitted symbol by determining the difference in amplitude between the first matched signal $\bar{S}_1$ and the second matched signal $\bar{S}_2$, and compare the difference to the amplitude of the second matched signal. If the difference is more than the amplitude of the second matched signal, then the received symbol is determined to be one which was filtered by the first pulse shaping filter at the transmitter, which in the present embodiment indicates a positive symbol, that is to say, a symbol with a positive polarity. If the difference is less than the amplitude of the second filtered signal, then the received symbol is determined to be one which was filtered by the first and the second pulse shaping filters at the transmitter, which in the present embodiment indicates a negative symbol. Once the polarity detector unit 1403a has detected a symbol and determined its polarity, $\{\bar{S}_1, \bar{S}_2\}$ is sent to the polarity demodulator 1404b for further processing in order to recover the polarity of the received symbol. Then, the polarity de-mapping unit de-maps the first matched signal $\bar{S}_1$ and the second matched signal $\bar{S}_2$ based on the following rule:

$$\bar{S} = \begin{cases} \bar{S}_1 & \text{if } |\bar{S}_1 - \bar{S}_2| > \bar{S}_2 \\ -(\bar{S}_1 + \bar{S}_2)/\sqrt{2} & \text{otherwise} \end{cases}.$$

Examples of orthogonal waveforms that satisfy these properties include those shown in FIGS. 8 and 9, and those shown in FIGS. 12 and 13.

Thus, the polarity de-mapping unit 1403b further comprises a polarity inverter that is configured to invert the polarity of symbols for which the polarity detector unit 1403a determines having a negative polarity symbol. In this way, the combined signal of the first filtered signal $\bar{S}_1$ and the second filtered signal $\bar{S}_2$ is then inverted in order to obtain a bipolar signal which can be sent to the demodulator 1404. The power level of the combined signal is also divided by a factor of $\sqrt{2}$ to obtain the correct amplitude.

FIG. 15 illustrates an OFDM demodulator 1505 for use in an OFDM system to convert bipolar real OFDM symbols into output bits, according to an embodiment of the present invention. The demodulator 1505 comprises a serial-to-parallel conversion unit 1501 configured to convert the symbols received from the symbol detector 1403 into a parallel stream blocks each comprising N symbols. This parallel time-domain data is then transformed into the frequency domain by a fast Fourier transform (FFT) unit 1502, and converted into serial data by a parallel-to-serial conversion unit 1503. Then, the serial data is sent to a constellation inverse mapping unit 1504 which is configured to perform constellation de-mapping in order to recover the originally transmitted data.

Whilst an OFDM embodiment is illustrated in FIG. 15, it will be appreciated that different types of demodulator may be provided in other embodiments of the present invention, according to the particular modulation scheme used.

A method performed at the receiver is illustrated in FIG. 16. First, in step S1601 a unipolar signal is received by the unipolar signal receiver 1401. Then, in step S1602, the received signal is filtered by the first and second matched filters 1402a, 1402b, enabling the receiver to separate out symbols from the first and second pulse filters of the transmitter. Then, in step S1603 the symbol detector 1403 performs symbol detection on the first and second filtered signals to obtain a plurality of symbols. Depending on the particular transmission scheme used, the method may further comprise a demodulation and/or demapping step to convert the plurality of symbols into data bits.

Figure 17:
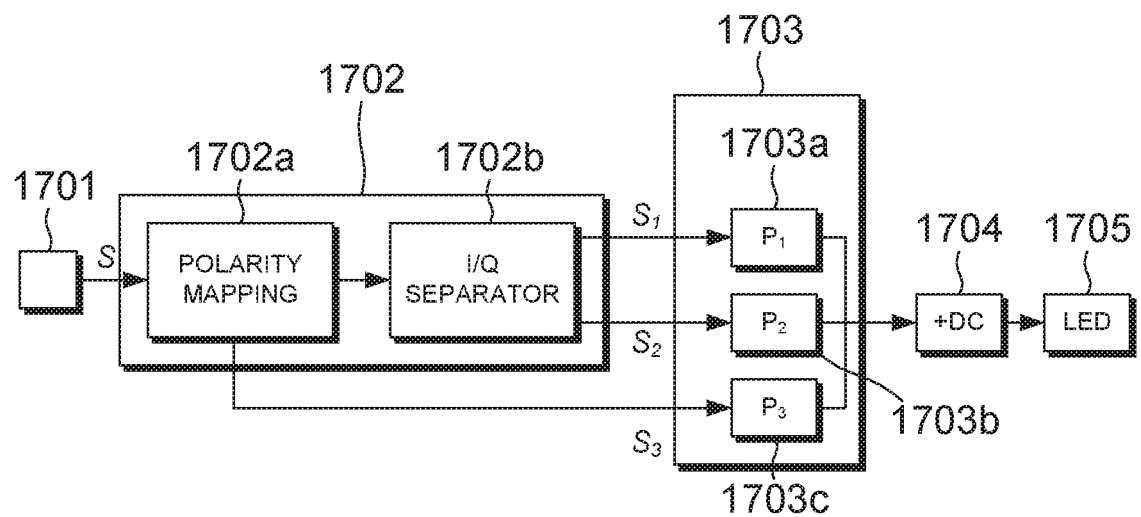
FIG. 17 illustrates apparatus for transmitting a unipolar signal in a wireless communication system, according to an embodiment of the present invention.
Figure 18:
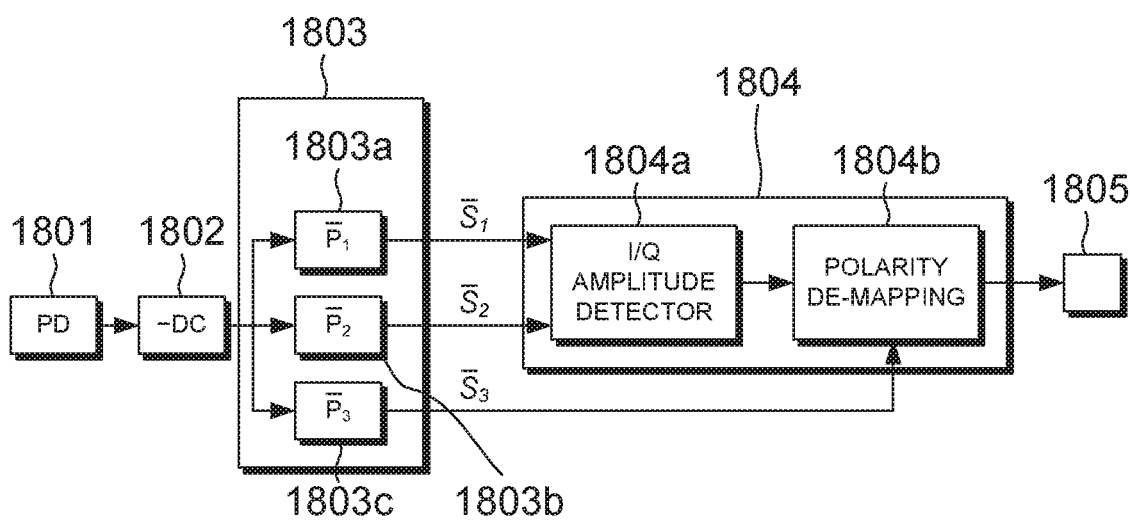
FIG. 18 illustrates apparatus for receiving a unipolar signal in a wireless communication system, according to an embodiment of the present invention.

Referring now to FIG. 17, apparatus for transmitting data via a unipolar signal is illustrated, according to an embodiment of the present invention. Apparatus for receiving the transmitted unipolar signal is illustrated in FIG. 18. Together, the transmitting apparatus of FIG. 17 and the receiving apparatus of FIG. 18 form a system for transmitting and receiving data via the unipolar signal emitted by an LED 1705 in the transmitter.

In the present embodiment, the apparatus for transmitting data via a unipolar signal comprises a data symbol generator 1701, a symbol allocating unit 1702, a pulse shaping filter bank 1703, a DC offset unit 1704, and a unipolar transmitter 1705. The symbol allocating unit 1702 comprises a polarity mapping unit 1702a and an in-phase/quadrature symbol separator 1702b. The pulse shaping filter bank 1703 comprises first, second and third pulse shaping filters 1703a, 1703b, 1703c. The in-phase/quadrature symbol separator 1702b is configured to allocate an in-phase part of a quadrature symbol to the first pulse shaping filter 1703a, and is configured to allocate a quadrature component of a quadrature symbol to the second pulse shaping filter 1703b. The polarity mapping unit 1702a is configured to send a polarity signal $S_3$ to the third pulse shaping filter 1703c, to signal to the receiver whether or not the polarity of the received symbol should be inverted.

The receiving apparatus comprises a unipolar signal receiver 1801, a DC offset removing unit 1802, a matched filter bank 1803, a symbol detector 1804, and a demodulator 1805. The matched filter bank 1803 comprises first, second and third matched filters 1803a, 1803b, 1803c, which are matched respectively to the first, second and third pulse shaping filters 1703a, 1703b, 1703c of the transmitter. The first matched filter 1703a outputs a first filtered signal which contains the in-phase component of the quadrature symbol, and the second matched filter 1703b outputs a second filtered signal which contains the quadrature component of the quadrature symbol.

The symbol detector 1804 comprises an amplitude detector 1804a which determines the respective amplitudes of the in-phase and quadrature components of a received data symbol. The in-phase and quadrature components can be combined to obtain the quadrature data symbol, which is then passed to the polarity de-mapping unit 1804b. The polarity de-mapping unit 1804b determines whether to invert the polarity of the quadrature data symbol according to the output of the third matched filter 1803c, which indicates the value of the polarity signal for the current data symbol.

In the present embodiment the receiver and transmitter are configured for use in a VLC system, and the unipolar signal receiver 1801 comprises a photodetector. In other embodiments a different type of receiver may be provided, depending on the type of unipolar signal that is used.

The data symbol generator 1701 generates data symbols by performing constellation mapping. The data symbol generator 1701 assigns $\log_2 M$ data bits to a quadrature signal ($\ddot{S} = \ddot{S}_\Re + \ddot{S}_\Im$) in a two-dimensional (2D) signal space $\ddot{S}$, for example a QAM constellation. The polarity mapping unit 1702a then converts the 2D symbol $\ddot{S}$ into a 3D symbol S by first converting the 2D symbol $\ddot{S}$ to a symbol $\dot{S}$ according to the following rule:

$$\ddot{S}_\Re > 0 \Rightarrow \dot{S} = \ddot{S};$$

$$\ddot{S}_\Re < 0 \Rightarrow \dot{S} = -\ddot{S}$$

and simultaneously generating a polarity pulse $S_3$ if $\ddot{S}$ is inverted. The polarity pulse $S_3$ is sent to a third pulse shaping filter 1703c in the pulse shaping filter bank 1703. The third pulse shaping filter 1703c is configured to apply a pulse shape which is orthogonal to first and second pulse shapes applied by first and second pulse shaping filters 1703a, 1703b, respectively. A corresponding third matched filter 1803c can be used at the receiver to separate the polarity pulse signal and determine whether or not the original symbol was inverted by the polarity mapping unit 1702a. If it is determined that the polarity of the symbol was inverted at the transmitter, then the polarity of the received symbol is inverted in the polarity de-mapping unit 1804b at the receiver, before passing the symbol to the demodulator 1805.

Afterward, the symbol S is split into the in-phase and quadratic parts, $S_1$ and $S_2$, respectively, to form the 3D symbol $S = \{S_1, S_2, S_3\}$. The 3D symbol therefore comprises three components. $S_1$, $S_2$ and $S_3$, which are filtered by separate ones of the orthogonal pulse shaping filters 1703a, 1703b, 1703c. This allows the receiver to recover the separate components of the 3D symbol by applying the corresponding matched filters 1803a, 1803b, 1803c.

The three components of the 3D signal $S_1$, $S_2$, and $S_3$, which may also be referred to as the constellation coefficients, then have the designated pulse shapes applied at the transmitter translate $\ddot{S}$ into a continuous time-domain signal (S(t)) which can be expressed as:

$$\ddot{S} \Rightarrow S(t) = S_1 P_1(t) + S_2 P_2(t) + S_3 P_3(t)$$

where $P_1(t)$, $P_2(t)$ and $P_3(t)$ are the three orthogonal pulse shapes that are utilized to transmit $S_1$, $S_2$ and $S_3$ respectively.

In the present embodiment, the time-domain signal S(t) that is generated by summing the first, second and third filtered signals in the transmitter is a bipolar signal. Hence the transmitter further comprises the DC offset unit 1704 which applies a DC bias to convert the bipolar time-domain signal S(t) to a unipolar signal that can be used to modulate the transmitting LED 1705. Assuming a linear relationship between the output optical power of the LED 1705 and the input drive current, the transmitted optical signal $S_o$ can be formulated as:

$$S_o(t) = S(t) + C$$

where C is the minimum required DC shift to ensure the unipolarity of S(t). Although a DC offset is still required in the embodiment of FIGS. 17 and 18, the DC offset is lower than would be required in a conventional DC-OFCM transmission system. Hence the unipolar signal transmission system illustrated in FIGS. 17 and 18 can achieve a higher energy efficiency than conventional DC-OFDM transmission systems.

Figure 19:
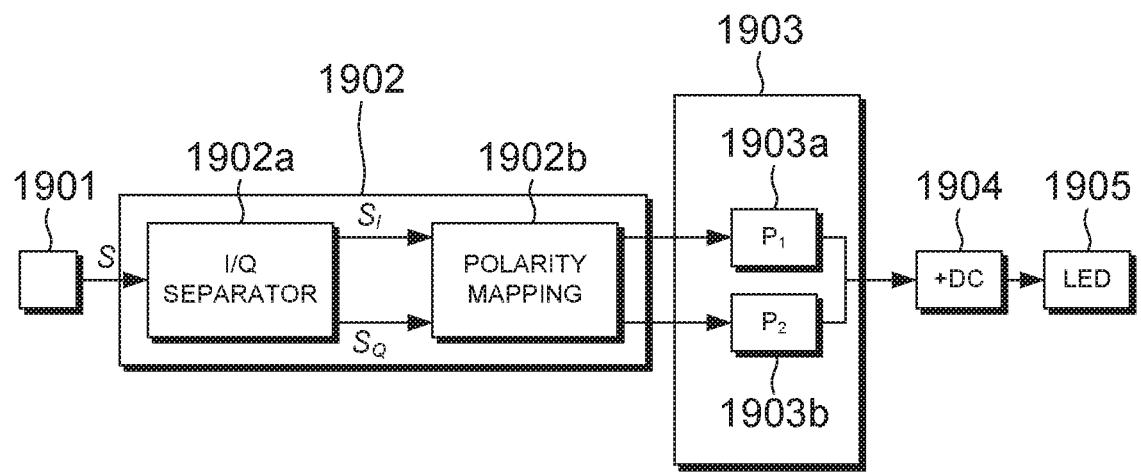
FIG. 19 illustrates apparatus for transmitting a unipolar signal in a wireless communication system, according to an embodiment of the present invention.

Referring now to FIG. 19, a graph is illustrated comparing the performance of unipolar wireless communication systems according to embodiments of the present invention against DC-OFDM transmission systems. FIG. 19 plots the bit error rate (BER) as a function of the energy per bit to noise power spectral density ratio ($E_b/N_0$) for DC-OFDM transmission systems with different constellation orders M, together with simulation results for corresponding unipolar OFDM systems according to embodiments of the present invention. As shown in FIG. 19, for any given value of the energy per bit to noise power spectral density ratio, a unipolar OFDM system according to an embodiment of the present invention provides a lower BER than a respective DC-OFDM system.

Figure 20:
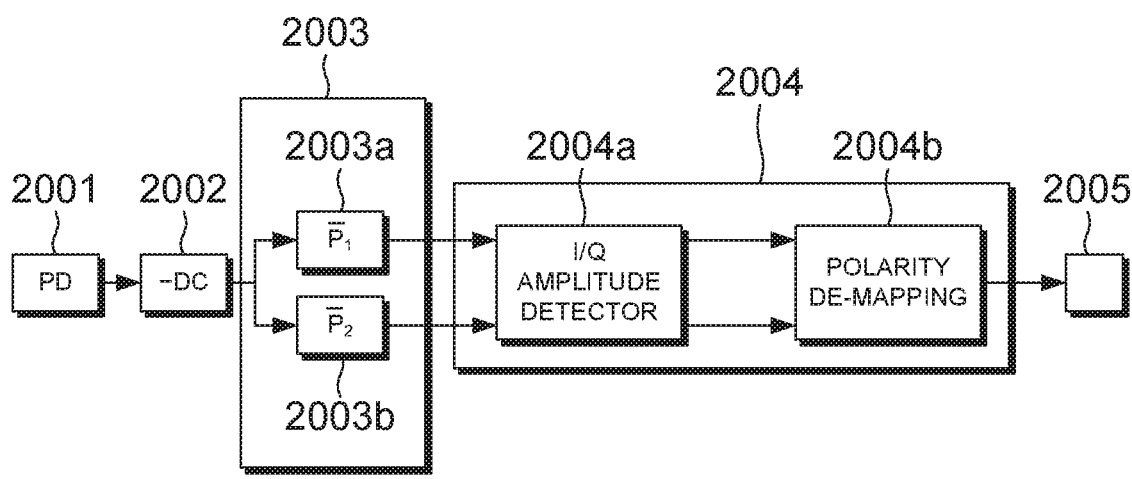
FIG. 20 illustrates apparatus for receiving a unipolar signal in a wireless communication system, according to an embodiment of the present invention.

Referring now to FIG. 20, four orthogonal pulse shapes that can be applied by a bank of up to four pulse shaping filters is illustrated, according to an embodiment of the present invention. In the embodiment shown in FIG. 20, a unipolar MHP pulse shape (n=0) can be used as a first pulse shape, a first order MHP pulse shape (n=1) can be used as a second pulse shape, a second order MHP pulse shape (n=2) can be used as third pulse shape, and a fourth order MHP pulse shape (n=4) can be used as a fourth pulse shape, according to an embodiment of the present invention.

Depending on the embodiment, some or all of the orthogonal pulse shapes could be applied by a pulse shaping filter bank. In one embodiment a pulse shaping filter bank may include three pulse shaping filters, each of which is configured to apply a different one of three orthogonal pulse shapes from among those illustrated in FIG. 20. For example, in a bank of three pulse shaping filters, the unipolar MHP pulse shape (n=0) can be used as a first pulse shape, a first order MHP pulse shape (n=1) can be used as a second pulse shape, and a second order MHP pulse shape (n=2) can be used as third pulse shape, according to an embodiment of the present invention.

Whilst certain embodiments of the invention have been described herein with reference to the drawings, it will be understood that many variations and modifications will be possible without departing from the scope of the invention as defined in the accompanying claims.

Referring now to FIG. 19, apparatus for transmitting data via a unipolar signal is illustrated, according to an embodiment of the present invention. Apparatus for receiving the transmitted unipolar signal is illustrated in FIG. 20. Together, the transmitting apparatus of FIG. 19 and the receiving apparatus of FIG. 20 form a system for transmitting and receiving data via the unipolar signal emitted by an LED 1905 in the transmitter.

In the present embodiment, the apparatus for transmitting data via a unipolar signal comprises a data symbol generator 1901, a symbol allocating unit 1902, a pulse shaping filter bank 1903, a DC offset unit 1904, and a unipolar transmitter 1905. The symbol allocating unit 1902 comprises an in-phase/quadrature symbol separator 1902a and a polarity mapping unit 1902b. The pulse shaping filter bank 1903 comprises one or more first pulse-shaping filters 1903a and one or more second pulse-shaping filters 1903b. The polarity mapping unit 1902b is configured to allocate a positive in-phase component or an inverted in-phase component of a quadrature symbol to a selected filter among the one or more first pulse shaping filters 1903a, and is configured to allocate a quadrature component or an inverted quadrature component of a quadrature symbol to a selected filter among the one or more second pulse shaping filters 1903b.

The receiving apparatus comprises a unipolar signal receiver 2001, a DC offset removing unit 2002, a matched filter bank 2003, a symbol detector 2004, and a demodulator 2005. The matched filter bank 2003 comprises one or more first matched filters 2003a and one or more second matched filters 2003b, which are matched respectively to the one or more first and second pulse-shaping filters 1903a, 1903b of the transmitter. The one or more first matched filters 2003a are configured to output first filtered signals which contain the in-phase component of the quadrature symbol, and the one or more second matched filters 2003b are configured to output second filtered signals which contain the quadrature component of the quadrature symbol.

The symbol detector 2004 comprises an in-phase and a quadrature amplitude detector 2004a that determines the respective amplitudes of the in-phase and quadrature components of a received data symbol and outputs first and second detected signals. Then the first and second signals are passed through a polarity de-mapping unit 2004b to determine the polarity of the in-phase and quadrature components in order to obtain the quadrature data symbol.

In the present embodiment the receiver and transmitter are configured for use in a VLC system, and the unipolar signal receiver 2001 comprises a photodetector. In other embodiments a different type of receiver may be provided, depending on the type of unipolar signal that is used.

The data symbol generator 1901 generates data symbols by performing constellation mapping. The data symbol generator 1901 assigns $\log_2 M$ data bits to complex point $(\ddot{S}_m = \ddot{S}_m^I + \ddot{S}_m^Q)$ in a two-dimensional (2D) signal space, $\dot{C}$, for example a QAM constellation. The in-phase and quadrature components separator 2004a splits the in-phase and quadrature components and the polarity mapping unit 2002a then sends $\ddot{S}_m^I$ and $\ddot{S}_m^Q$, respectively, to the selected pulse-shaping filter $P_{m,i}^1(t)$ among the one or more first pulse-shaping filters $\{P_i^1(t)\}_{i=1}^{N_t}$ 1903a and to the selected pulse-shaping filter $P_{m,q}^2(t)$ among the one or more second pulse-shaping filters $\{P_q^2(t)\}_{q=1}^{N_2}$ 1903b. In the present embodiment the in-phase and quadrature components separator 2004a uses a look up table to convert the 2D symbol $\ddot{S}$ into a $(N_t, N_2)$-D symbol $S(t)=S_1(t)+S_2(t)$ by converting the 2D symbol $\ddot{S}_m$ to the combined signal of $S_1(t)$ and $S_2(t)$ according to the following rule:

$$\ddot{S}_m^R \Rightarrow S_1(t) = |\ddot{S}_m^I| P_{m,i}^1(t);$$

$$\ddot{S}_m^I \Rightarrow S_2(t) = |\ddot{S}_m^Q| P_{m,q}^2(t);$$

Thus, the continuous time signal $S(t)$ can be expressed mathematically as a weighted linear combination of the one or more first and second pulse-shaping filters 1903a, 1903b by:

$$\ddot{S} \Rightarrow S(t) = \sum_{i=1}^{N_1} S_{m,i}^1 P_i^1(t) + \sum_{q=1}^{N_2} S_{m,q}^2 P_i^2(t)$$

Given the employed look up table, $P_{m,i}^1(t)$ is either the positive or the inverted pulse shape $P_i^1(t)$ and, similarly, $P_{m,q}^2(t)$ is the positive or the inverted pulse shape $P_q^2(t)$. The look up table can be generated in more than one way:

Criterion 1: by choosing only two pulse shapes such that the required DC shift in the DC offset unit 1904 to transmit all the symbols in the constellation $\dot{C}$ is minimized, i.e. all the quadrature components of the constellation points $\ddot{S}_m^I$ and $\ddot{S}_m^Q$ are mapped to the positive and negative pulse shapes of $P_1^1(t)$ and $P_1^2(t)$. Thus, based on this selection method the one or more first and second pulse shaping filters 1903a, 1903b comprises only one selected pulse shape $P_1^1(t)$ and $P_1^2(t)$, respectively.

Criterion 2: A first and second plurality of pulse shapes are selected such that the required DC shift in the DC offset unit 1904 to transmit each quadrature plane in the constellation $\dot{C}$ is minimized, i.e. the quadrature components of the first quadrature plane that has $\ddot{S}_m^I > 0$ and $\ddot{S}_m^Q > 0$ are mapped to the combination of pulse shapes $P_{m,i_1}^1(t)$ and $P_{m,q_1}^1(t)$ that minimizes the required DC-shift to transmit all the quadrature components of the first quadrature plane, the quadrature components of the second quadrature plane that has $\ddot{S}_m^I < 0$ and $\ddot{S}_m^Q > 0$ are mapped to the combination of pulse shapes $P_{m,i_2}^1(t)$ and $P_{m,q_2}^1(t)$ that minimizes the required DC-shift to transmit all the quadrature components of the second quadrature plane, the quadrature components of the third quadrature plane that has $\ddot{S}_m^I < 0$ and $\ddot{S}_m^Q < 0$ are mapped to the combination of pulse shapes $P_{m,i_3}^1(t)$ and $P_{m,q_3}^1(t)$ that minimizes the required DC-shift to transmit all the quadrature components of the third quadrature plane and the quadrature components of the fourth quadrature plane that has $\ddot{S}m^I > 0$ and $\ddot{S}_m^Q < 0$ are mapped to the combination of pulse shapes $P_{m,i_4}^1(t)$ and $P_{m,q_4}^1(t)$ that minimizes the required DC-shift to transmit all the quadrature components of the fourth quadrature plane.

Criterion 3: A first and second plurality of pulse shapes are selected such that the required DC shift in the DC offset unit 1904 to transmit each symbol in the constellation $\dot{C}$ is minimized.

One or more corresponding first and second matched filters 2003a, 2003b can be used at the receiver to separate the transmitted signals $\{S_{m,i}^1\}_{i=1}^{N_1}$ and $\{S_{m,q}^2\}_{q=1}^{N_2}$, respectively, and output one or more first matched signals $\{\bar{S}_i^1\}_{i=1}^{N_1}$ and one or more second matched signals $\{\bar{S}_q^2\}_{q=1}^{N_2}$. Then the symbol detector unit 2004 determines the amplitude of the quadrature components and determines whether or not the original in-phase and/or quadrature components were inverted by the polarity mapping unit 1902b using the in-phase/quadrature amplitude detector 2004a and the polarity de-mapping unit 2004b. In the present embodiment the in-phase/quadrature amplitude detector 2004a comprises first and second amplitude detectors that detect the signals which have the maximum amplitude values among the one or more first and second matched signals of $\{|\bar{S}_i^1|\}_{i=1}^{N_1}$ and $\{|\bar{S}_q^2|\}_{q=1}^{N_2}$, respectively, and output a first detected signal $\bar{S}_i^1$ and a second detected signal $\bar{S}_q^2$, respectively. Then, the polarity de-mapping units 2004b de-maps the first and second detected signals based on an inverse look up table that is the inverse of the look up table used at the transmitter. If the in-phase/quadrature amplitude detector 2004a determines based on the inverse look up table that the polarity of the in-phase and/or the quadrature components is inverted at the transmitter, then the polarity of each of the detected amplitude of the in-phase and the quadrature components is inverted in the polarity de-mapping unit 2004b at the receiver, before passing the symbol to the demodulator 2005. The above discussed receiver is a low computationally complex detector, however, a computationally complex joint maximum likelihood detector can be utilized to detect the transmitted symbol by comparing the first and second matched filters 2003a, 2003b to all the possible corresponding transmitted signals $\{S_{m,i}^1\}_{i=1}^{N_1}$ and $\{\overline{S}_{m,i}^2\}_{i=1}^{N_1}$, respectively.

Figure 21:
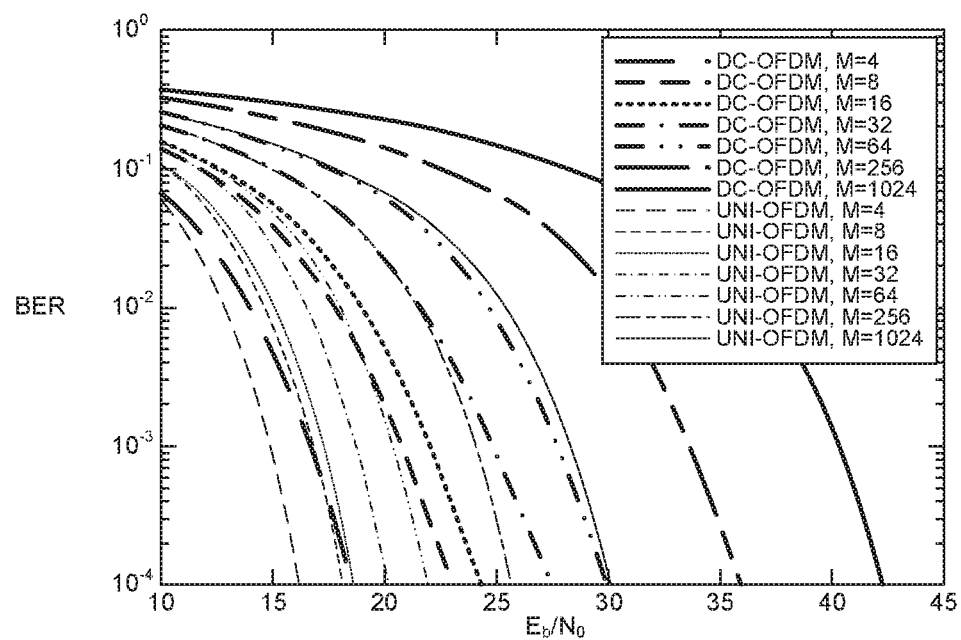
FIG. 21 is a graph comparing the performance of unipolar wireless communication systems according to embodiments of the present invention against direct-current OFDM transmission systems.

Referring now to FIG. 21, a graph is illustrated comparing the performance of unipolar wireless communication systems according to embodiments of the present invention against DC-OFDM transmission systems. FIG. 21 plots the bit error rate (BER) as a function of the energy per bit to noise power spectral density ratio ($E_b/N_0$) for DC-OFDM transmission systems with different constellation orders M, together with simulation results for corresponding unipolar OFDM systems according to embodiments of the present invention. As shown in FIG. 21, for any given value of the energy per bit to noise power spectral density ratio, a unipolar OFDM system according to an embodiment of the present invention provides a lower BER than a respective DC-OFDM system.

Figure 22:
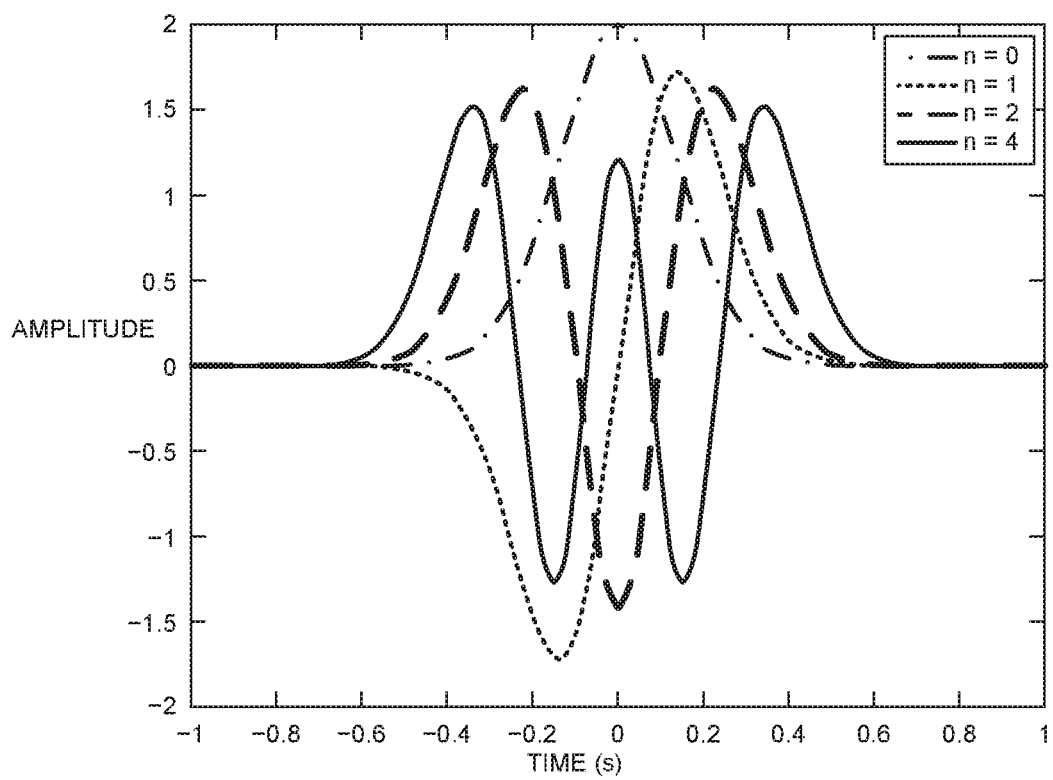
FIG. 22 illustrates four orthogonal pulse shapes that can be applied by a bank of pulse shaping filters, according to an embodiment of the present invention.

Referring now to FIG. 22, four orthogonal pulse shapes that can be applied by a bank of up to four pulse shaping filters is illustrated, according to an embodiment of the present invention. In the embodiment shown in FIG. 22, a unipolar MHP pulse shape (n=0) can be used as a first pulse shape, a first order MHP pulse shape (n=1) can be used as a second pulse shape, a second order MHP pulse shape (n=2) can be used as third pulse shape, and a fourth order MHP pulse shape (n=4) can be used as a fourth pulse shape, according to an embodiment of the present invention.

Depending on the embodiment, some or all of the orthogonal pulse shapes could be applied by a pulse shaping filter bank. In one embodiment a pulse shaping filter bank may include three pulse shaping filters, each of which is configured to apply a different one of three orthogonal pulse shapes from among those illustrated in FIG. 22. For example, in a bank of three pulse shaping filters, the unipolar MHP pulse shape (n=0) can be used as a first pulse shape, a first order MHP pulse shape (n=1) can be used as a second pulse shape, and a second order MHP pulse shape (n=2) can be used as third pulse shape, according to an embodiment of the present invention.

Whilst certain embodiments of the invention have been described herein with reference to the drawings, it will be understood that many variations and modifications will be possible without departing from the scope of the invention as defined in the accompanying claims.

What is claimed is:

1. Apparatus for transmitting a symbol via a unipolar signal, the apparatus comprising:
   a symbol allocating unit configured to receive a symbol and allocate the symbol to one or more signals among a plurality of signals;
   a filter bank comprising a plurality of orthogonal pulse shaping filters each configured to apply pulse shaping to a respective one of the plurality of signals and output a filtered signal, wherein the filtered signals outputted by the plurality of pulse shaping filters are orthogonal signals; and
   a transmitter configured to transmit the sum of the filtered signals as a unipolar signal, wherein the transmitted signal is a weighted sum of the orthogonal pulse shapes.

2. The apparatus according to claim 1, wherein the symbol is a quadrature symbol and the symbol allocating unit is configured to allocate an in-phase component of the quadrature symbol to a first one of the plurality of signals and allocate a quadrature component of the quadrature symbol to a second one of the plurality of signals.

3. The apparatus according to claim 1, wherein the symbol allocating unit is configured to receive a symbol as a bipolar signal and the plurality of signals comprises a first signal and a second signal, wherein the symbol allocating unit comprises:
   a polarity detector configured to allocate the symbol either to the first signal or to both the first and second signals by determining a polarity of the symbol, allocating the symbol to the first signal only in response to a determination that the symbol has a first polarity, and allocating the symbol to both the first and second signals in response to a determination that the symbol has an opposite polarity to the first polarity, and a polarity mapper configured to invert a polarity of a negative symbol before pulse shaping is applied.

4. The apparatus according to claim 1 wherein the filter bank comprises:
   a first pulse shaping filter configured to apply a unipolar first modified Hermite pulse (MHP) shape; and
   a second pulse shaping filter configured to apply an orthogonal bipolar second MHP pulse shape,
   wherein a sum of the first MHP pulse shape and the second MHP pulse shape is unipolar.

5. The apparatus according to claim 1, wherein the filter bank comprises:
   a first pulse shaping filter configured to apply a unipolar first square pulse shape; and
   a second pulse shaping filter configured to apply an orthogonal bipolar second square pulse shape,
   wherein a sum of the first square pulse shape and the second square pulse shape is unipolar.

6. The apparatus according to claim 1, wherein the filter bank comprises:
   a first pulse shaping filter configured to apply a unipolar first prolate spheroidal wave functions (PSWF) pulse shape; and
   a second pulse shaping filter configured to apply an orthogonal bipolar second PSWF pulse shape,
   wherein a sum of the first PSWF pulse shape and the second PSWF pulse shape is unipolar.

7. The apparatus according to claim 1, wherein the symbol is a quadrature symbol, the plurality of signals comprises first, second and third signals, and the filter bank comprises first, second and third filters configured to apply pulse shaping to the first, second and third signals respectively,
   wherein the symbol allocating unit is configured to allocate an in-phase component of the symbol to the first signal and to allocate a quadrature component of the symbol to the second signal,
   wherein the symbol allocating unit is further configured to determine the polarity of the symbol, invert a polarity of the symbol before pulse shaping is applied in response to a determination that the symbol has a negative polarity, and control the third signal to indicate whether or not the polarity of the symbol was inverted.

8. The apparatus according to claim 1, wherein the symbol is a quadrature symbol, the plurality of signals comprises one or more first signals and one or more second signals, the filter bank comprises one or more first filters and one or more second filters configured to apply pulse shaping to the one or more first and second signals respectively, and the symbol allocating unit is configured to determine the amplitude and polarity of each of an in-phase and quadrature components of the symbol, and to allocate the in-phase component to one of the one or more first signals and to allocate the quadrature component to one of the one or more second signals according to a predetermined look up table.

9. The apparatus according to claim 8, wherein the one or more first signals comprises a first signal and the one or more second signals comprises second, third and fourth signals, the one or more first orthogonal pulse-shaping filters comprises a first pulse shaping filter and the one or more second orthogonal pulse-shaping filters comprises second, third and fourth filters, and the first, second, third and fourth orthogonal pulse-shaping filters are configured to apply pulse shaping to the first, second, third and fourth signals respectively, wherein in response to a determination that the in-phase component has a positive polarity, the symbol allocating unit is configured to allocate the positive in-phase component to the first signal and allocate the quadrature component to the second signal, wherein in response to a determination that the in-phase component has a negative polarity, the symbol allocating unit is configured to invert a polarity of the in-phase component and allocate the inverted in-phase component to the first signal, to allocate the quadrature component to the third signal in response to a determination that the quadrature component has a positive polarity, and to invert a polarity of the quadrature component and allocate the inverted quadrature component to the fourth signal in response to a determination that the quadrature component has a negative polarity.

10. The apparatus according to claim 1, wherein the sum of the filtered signals comprises a bipolar signal, and the apparatus further comprises:

a direct current DC biasing unit configured to apply a DC bias to convert the bipolar signal to a unipolar signal, before the filtered signals are transmitted by the transmitter.

11. The apparatus according to claim 1, wherein the unipolar signal generator is configured to transmit the filtered signals as a Visible Light Communication VLC signal.

12. The apparatus of claim 1 included in a wireless communication system as a unipolar signal transmitter, the wireless communication system further comprising:

a unipolar signal receiver comprising:
a receiver configured to receive a unipolar signal;
a matched filter bank comprising a plurality of orthogonal matched filters each configured to apply filtering to the received unipolar signal and output a filtered signal; and
a symbol detector configured to perform symbol detection on the plurality of filtered signals outputted by the matched filter bank to determine the received symbol.

13. A method of transmitting a symbol via a unipolar signal, the method comprising:

allocating a symbol to one or more signals among a plurality of signals;
applying pulse shaping to the plurality of signals to obtain a plurality of filtered signals, wherein the filtered signals are orthogonal signals; and
transmitting the sum of the filtered signals as a unipolar signal, wherein the transmitted signal is a weighted sum of the filtered signals.

14. A non-transitory computer-readable storage medium arranged to store computer program instructions which, when executed, perform a method of transmitting a symbol via a unipolar signal, the method comprising:

allocating a symbol to one or more signals among a plurality of signals;
applying pulse shaping to the plurality of signals to obtain a plurality of filtered signals, wherein the filtered signals are orthogonal signals; and
transmitting the sum of the filtered signals as a unipolar signal, wherein the transmitted signal is a weighted sum of the filtered signals.

* * * * *